July 19, 1960     E. A. BELTRANI     2,945,407
SHIELDED WIRE DIELECTRIC EJECTOR
Filed Sept. 23, 1959     2 Sheets-Sheet 1
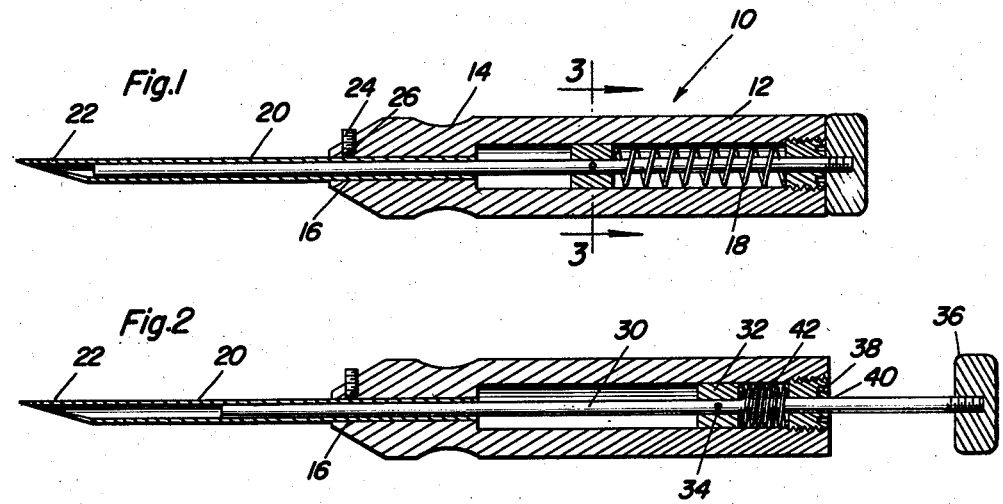
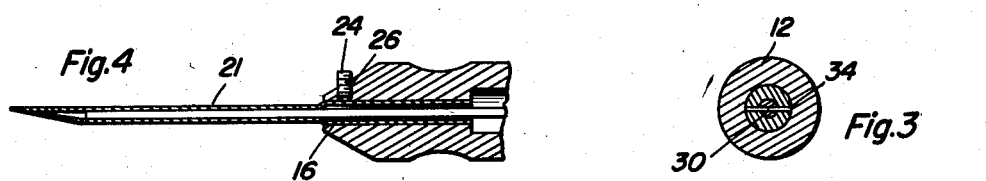
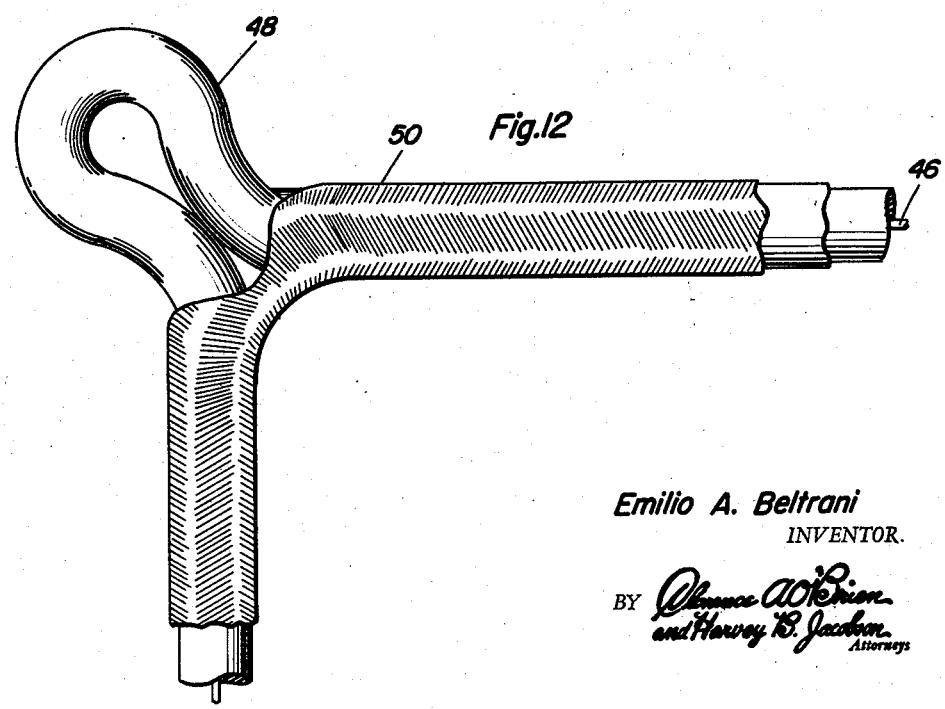
Emilio A. Beltrani
INVENTOR.

July 19, 1960 E. A. BELTRANI 2,945,407
SHIELDED WIRE DIELECTRIC EJECTOR
Filed Sept. 23, 1959 2 Sheets-Sheet 2
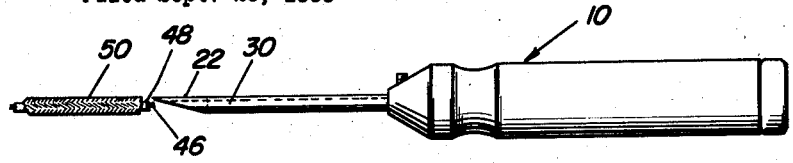
*Fig.5*
*Fig.6*
*Fig.7*
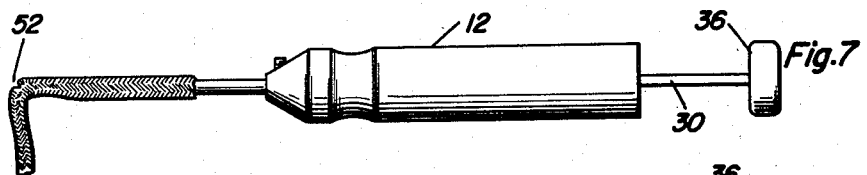
*Fig.8*
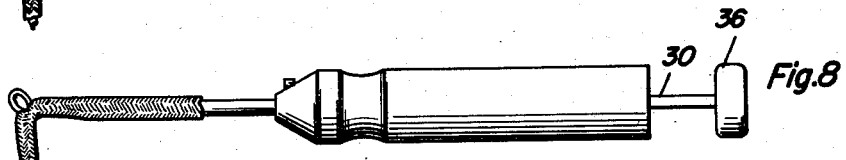
*Fig.9*
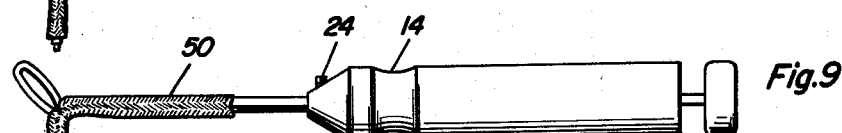
*Fig.10*
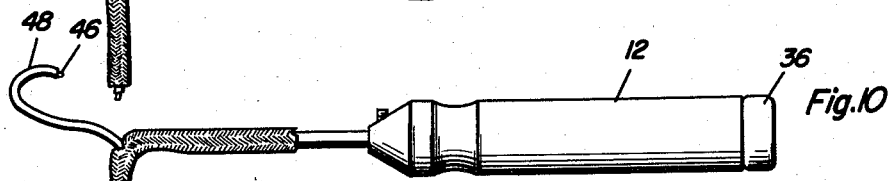
*Fig.11*
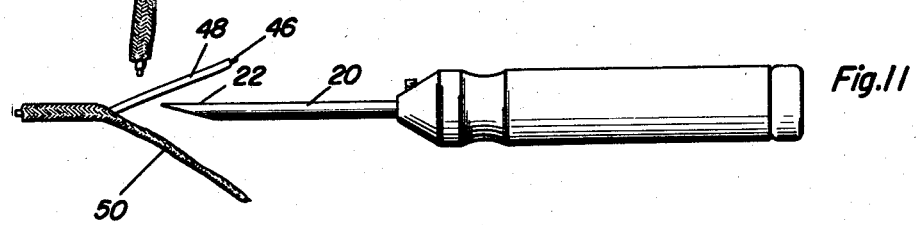
Emilio A. Beltrani
INVENTOR.
BY
Attorneys

United States Patent Office 2,945,407
Patented July 19, 1960

2,945,407

SHIELDED WIRE DIELECTRIC EJECTOR

Emilio A. Beltrani, 2173 W. 9th St., Brooklyn 23, N.Y.

Filed Sept. 23, 1959, Ser. No. 841,896

2 Claims. (Cl. 81—3)

This application is a continuation-in-part of application Serial No. 765,073, filed October 3,1958, now abandoned for Shielded Wire Dielectric Ejector.

This invention relates generally to tools utilized in the assembly of electrical equipment and more specifically to a novel tool particularly designed for stripping the shielding braid of shielded wire cable from the dielectric within.

In the manufacture and installation of electrical equipment, recent trends have brought about an increase in the utilization of shielded wire cable for various purposes. The electrical engineer is becoming increasingly aware of the advantages obtained from the use of shielded wire cable rather than conventional wire for an enormous number of purposes. In the utilization of shielded wire cable, generally the shielding braid is grounded proximate the point where the inner electrical conductor is electrically secured. Of course to do this, it is initially necessary to strip a portion of the shielding braid away from the inner conductor and accompanying dielectric so the end points of the inner conductor and shielding braid may be sufficiently electrically spaced. It is of course desirable to strip the shielding braid in a manner such as not to damage the braid or the inner conductor and accompanying dielectric. Various devices have been developed and methods suggested for properly stripping the shielding braid from the inner conductor, but, however, all of the methods known to the inventor are cumbersome, time consuming and generally inefficient and unsatisfactory. Accordingly, the principal object of this invention is to provide a novel hand tool particularly adapted for stripping the shielding braid of shielded wire cable from the dielectric within.

It is a further object of this invention to provide a novel method of stripping shielding braid of shielded wire cable from an inner conductor.

It is a further object of this invention to provide a novel hand tool which while capable of more efficiently stripping shielding braid of shielded wire cable from an inner dielectric than heretofore known devices, is relatively simple in construction and inexpensive.

It is a still further object of this invention to provide a novel hand tool for stripping shielding braid of shielded wire cable from an inner conductor and dielectric which may be utilized with all size shielded wire cables and with single and multistrand also.

In accordance with the above stated objects, below is particularly described the method of, and a single tool particularly adapted for, stripping the shielding braid of shielded wire cable from the inner dielectric. The method includes passing a tubular member between the shielding braid and the dielectric and slightly opening the shielding at a desired distance from the cable end point while ejecting the dielectric under constant spring and intermittent hand pressure through the opening in the shielding braid. The tool described for aiding in the practice of the method includes a handle and an elongated tubular shielding braid piercing member terminally carried by the handle. The piercing member has a flat rounded point at the end remote from the handle having an opening arcuate cross section adapted to ride between the shielding braid and the inner dielectric while partially circumscribing the inner dielectric while the tublar portion of the piercing member fully circumscribes the inner dielectric. A slidable ejector rod is concentrically carried within the piercing member. The handle has a rear cavity therein and the ejector rod passes completely through the handle and cavity and projects on either side of the handle. A collar is detachably fixed on the ejector rod and adapted to slide in the handle cavity while a rear cavity cap is removably and terminally fixed in the cavity. An aperture in the cavity cap allows the rod to slidably extend therethrough. A helical spring is concentrically fitted about the rod between the rod collar and the cavity cap whereby the rod is continually urged toward the flat rounded point on the piercing member. It is to be noted that the piercing member is removably carried by the handle and various sizes piercing members may be readily substituted in the handle depending on the particular size of shielded wire cable desired to be stripped.

Other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view taken along the longitudinal center plane of the tool;

Figure 2 is a sectional view along the longitudinal center plane of the tool as in Figure 1, however, showing the ejector rod withdrawn;

Figure 3 is a sectional view taken substantially along the plane 3—3 of Figure 1;

Figure 4 is a fragmentary sectional view illustrating the utilization of a modified piercing member;

Figures 5 through 11 are elevational side views illustrating the tool of this invention in different phases in accomplishing the novel method of stripping the shielding braid of shielded wire cable from the inner conductor and dielectric; and Figure 12 is an enlarged fragmentary view of the cable substantially as it appears in Figure 8.

With continuing reference to the drawing the numeral 10 generally represents the ejector tool of this invention including an elongated handle 12 which may be constructed of any desired material such as wood or steel. The exact design of the handle is not significant in this invention. However, the handle must of necessity include certain features such as a finger grip portion 14, a forward passage 16 and a rearward cavity 18 communicating with said forward passage.

Adapted to be held in the forward passage 16 of the handle 12 is a piercing member 20 having a flat rounded point 22 and a substantially arcuate cross-section. The piercing member 20 is held in the passage 16 by a setscrew 24 which extends through a threaded aperture 26 in the handle 12 above the passage 16. The setscrew 24 is readily removable and modified sizes of piercing members as 21 illustrated in Figure 4 may be substituted for piercing member 20 shown in Figure 1. It is to be noted that the rear portion of the piercing member 21 is thicker than the forward portion and is substantially equal to the thickness of the piercing member 20. This construction is of course necessitated by the desire to make the handle 12 and passage 16 adaptable to fit various size piercing members so that the tool 10 may be utilized with various sizes shielded wire cables.

An ejector rod 30 has a collar 32 which fits therearound and is held fixed to the rod 30 by pin 34 passing through the rod and collar. The collar 32 is fitted to the cavity 18 and adapted to slide therein while the rod 30 slides through the passage 16 and within the piercing member 20. A hand pressure knob 36 is terminally threaded on the ejector rod 30 for allowing for simple manual movement of the rod 30.

A rear cavity cap 38 is threaded in the cavity and includes a central aperture 40 for slidably fitting about the ejector rod 30. A helical spring 42 is fitted between the rod collar 32 and the cavity cap 38 whereby the collar 32, pin 34, and rod 30 will be continually urged toward the flat rounded point 22 of piercing member 20.

In now describing the correct operation of the tool of Figure 1, let us refer to Figures 5 through 11. Initially, a portion of the inner conductor 46 and dielectric 48 are exposed by pushing the shielding braid 50 slightly away. The shielded wire dielectric ejector 10 is then taken and the point 22 is inserted between the shielding braid 50 and the dielectric 48 with the dielectric 48 entering the piercing member 20 just below the point 22. Using the fingers on the other hand as a guide, the shielded wire dielectric ejector 10 is pushed forward as indicated in Figure 6 and the dielectric 48 and inner conductor 46 bears against the ejector rod 30 and force the ejector rod rearwardly through the cavity 18 against the forward spring urging of spring 42. It will in turn be realized that the spring 42 acts to continually urge the dielectric forward relative to the braid 50. At the desired length of strip, the leading point of the tool 22 pierces the braiding 50 so as to slightly enlarge the braid links to form a small opening as it is indicated at 52 in Figure 7. It is of course apparent that while the shielded wire dielectric ejector was being pushed forward the ejector rod 30 was being pushed rearwardly by the dielectric 48 against the pressure of spring 42. After the slight opening is formed in the braid, as in Figure 7, the spring 42, continually urging the dielectric 48, tends to push it through the braid opening. The constant spring urging eases the braid links aside with minimum impairment thereof. It may be necessary to slightly roll the tool or apply hand pressure to the knob 36 on rod 30 to extend the dielectric out of the braid to the position shown in Figure 9. At this time, the piercing member 20 and point 22 of the tool 10 are acting as a guide for the dielectric which is being eased through the braid links at 52. The ejection of the dielectric is complete when the ejector rod knob 36 is seated on the handle 12 of the shielded wire dielectric ejector as in Figure 10. The shielded wire dielectric ejector is then withdrawn from the shielded braid as in Figure 11 and the operation is complete.

The above process has been recited utilizing a single conductor wire for an illustration, however, it should be noted that the tool 10 is as effective with a multi-conductor braided shielded wire and also an insulated shielded wire and coaxial wire. It is worth noting, however, that an extra step must be taken on insulated shielded wire or coaxial wire which would include the cutting of the insulation off the braided shield with a razor knife or conventional stripper before proceeding with the method recited. Once the outer jacket or insulation is removed it is apparent that the insulated shielded wire or coaxial wire may be stripped according to the procedure noted above.

It should now be apparent to one skilled in the art that the tool above described and the method called for is a tremendous time and labor saver. Irksome jobs of the past may be done quickly and easily without any resulting marring or damaging of the dielectric or braid. Therefore, there is a further saving of costs in material in the utilization of this device and method too. It is to be appreciated that when the tool is not being utilized, the spring 42 retains the knob 36 against the handle 12 as indicated in Figure 1 thereby making the tool compact and easy to handle. Further, inasmuch as the spring 42 retains the ejector rod 40 within the handle at all times, it is not likely to become misaligned. Still further, since the ejector rod 40 extends nearly to the point 22, it prevents dirt from entering the member 20 which might impair the operation thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An ejector tool, particularly adapted for stripping the shielding braided of shielded wire cable from an inner conductor, comprising a handle, an elongated tubular shielding braid piercing member terminally carried by said handle, said piercing member having a flat rounded point at the end remote from said handle, said flat rounded point having an open arcuate cross-section adapted to partially circumscribe said inner conductor, a slidable ejector rod concentrically carried within said piercing member, a cavity in said handle, said ejector rod extending into said cavity, a collar detachably fixed on said rod and adapted to slide in said cavity, a cavity cap removably and terminally fixed in said cavity, an aperture in said cavity cap, said rod slidably extending through said aperture, and a helical spring concentrically fitted about said rod between said rod collar and said cavity cap for urging said rod toward said flat rounded point.

2. The combination of claim 1 wherein said piercing member is detachably carried by said handle whereby various size members may be utilized with said handle.

References Cited in the file of this patent

UNITED STATES PATENTS

| 512,381 | Keyes | Jan. 9, 1894 |
| 842,631 | Deperdussin | Jan. 29, 1907 |
| 2,842,017 | Watson | July 8, 1958 |

FOREIGN PATENTS

| 765,640 | Great Britain | Jan. 9, 1957 |
| 793,378 | Great Britain | Apr. 16, 1958 |